March 18, 1924.
T. SLOPER
1,487,035
APPARATUS FOR USE IN THE MANUFACTURE OF RUBBER GOODS
Filed Jan. 11, 1923   4 Sheets-Sheet 1
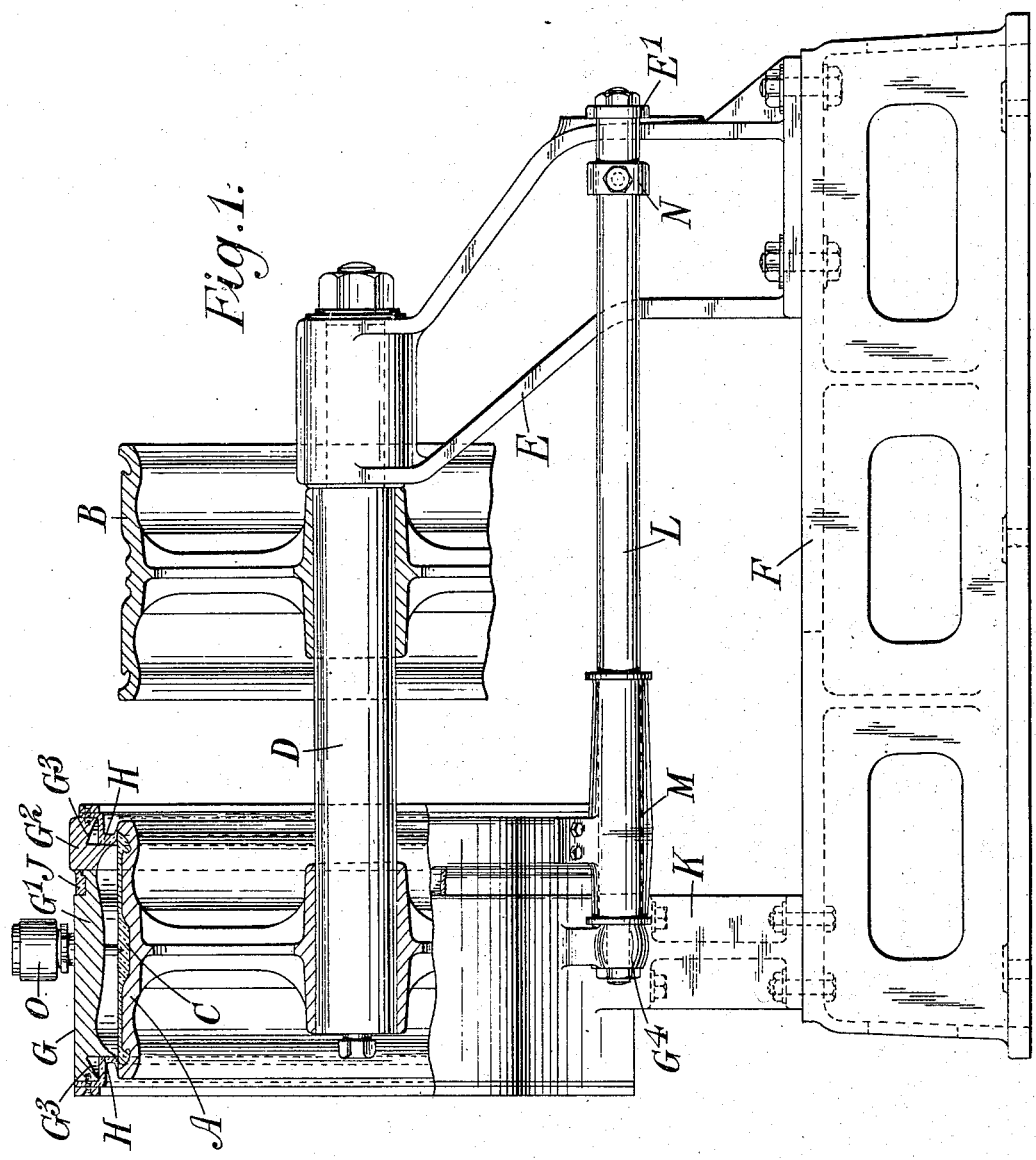
INVENTOR.
Thomas Sloper
by his attorneys
Byrnes, Stebbins & Parmelee.

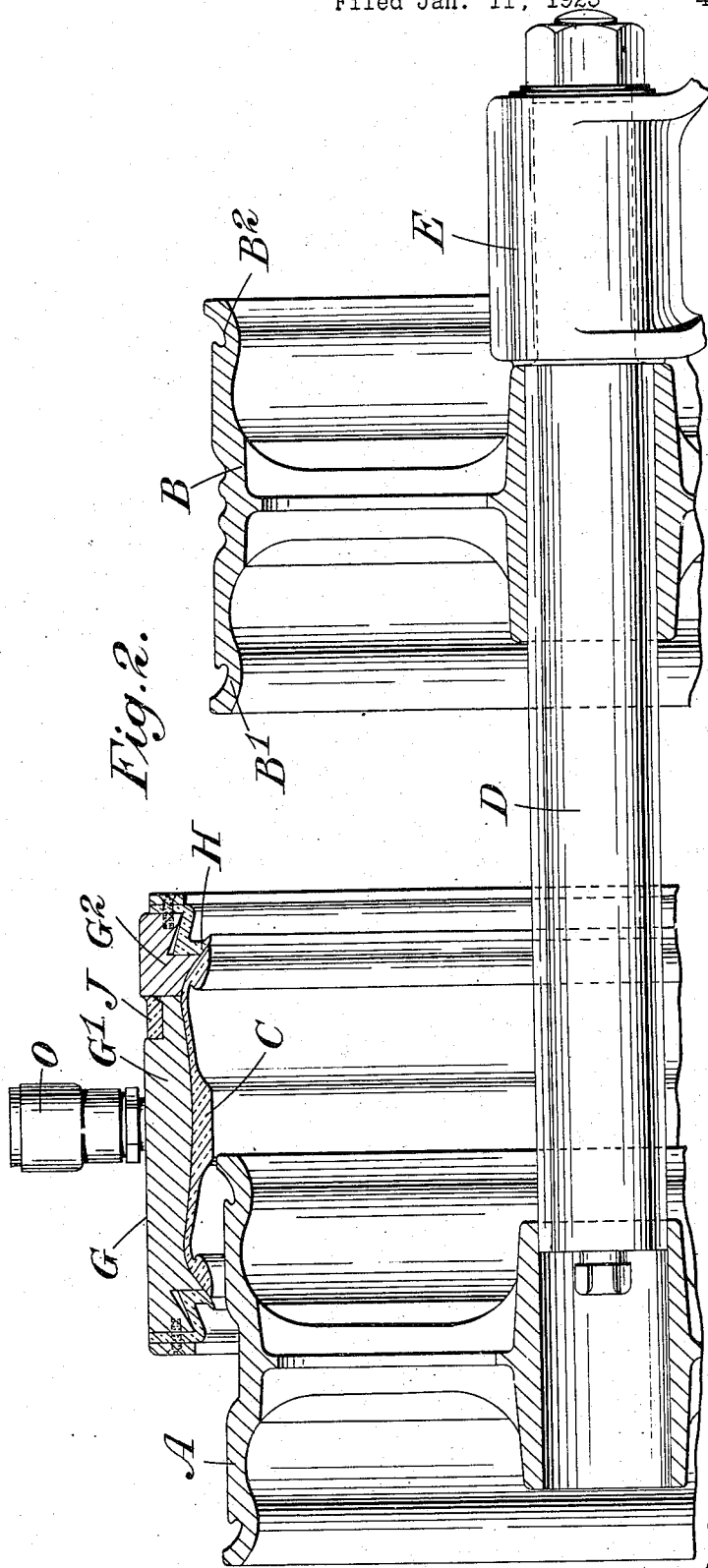

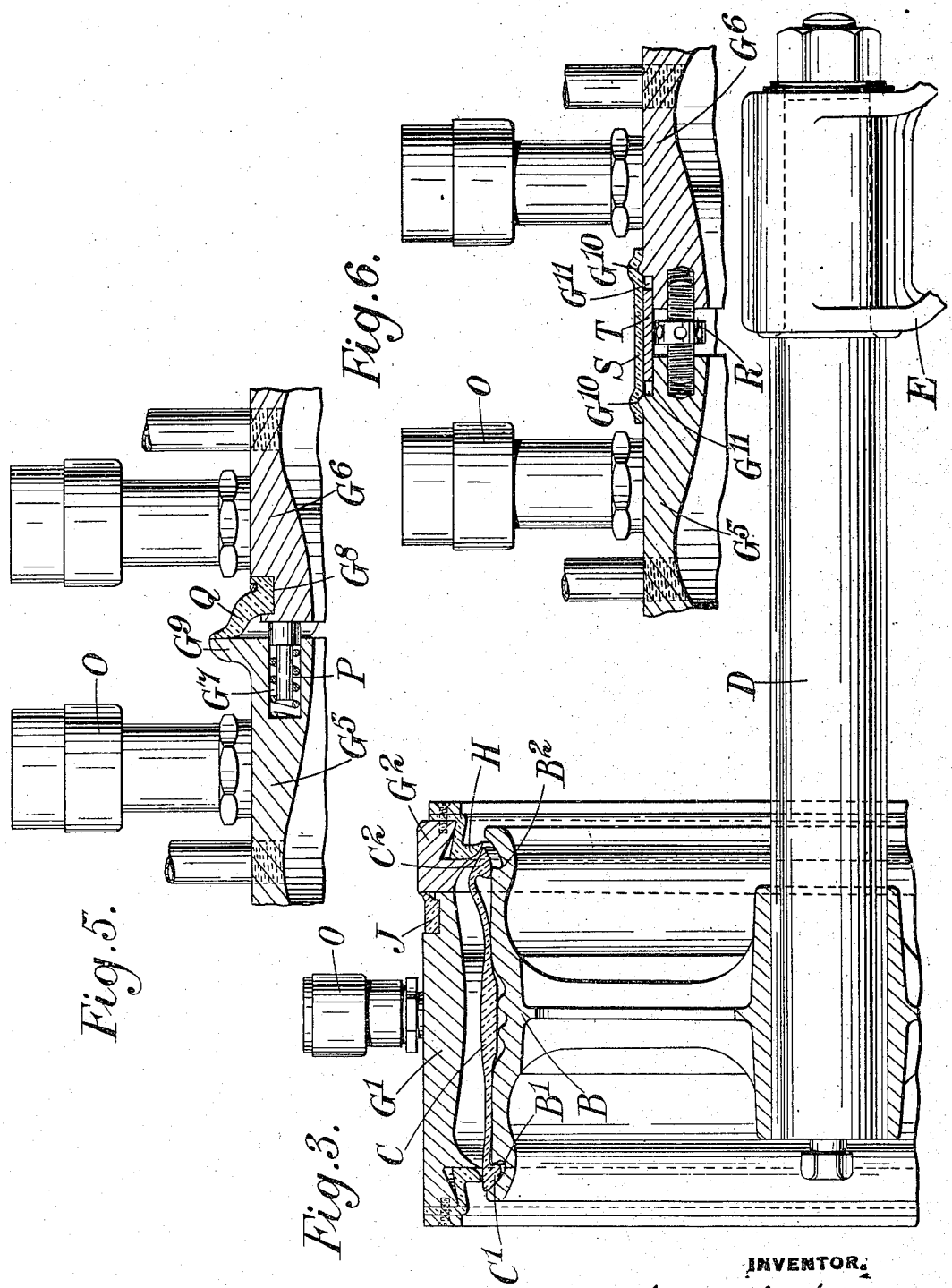

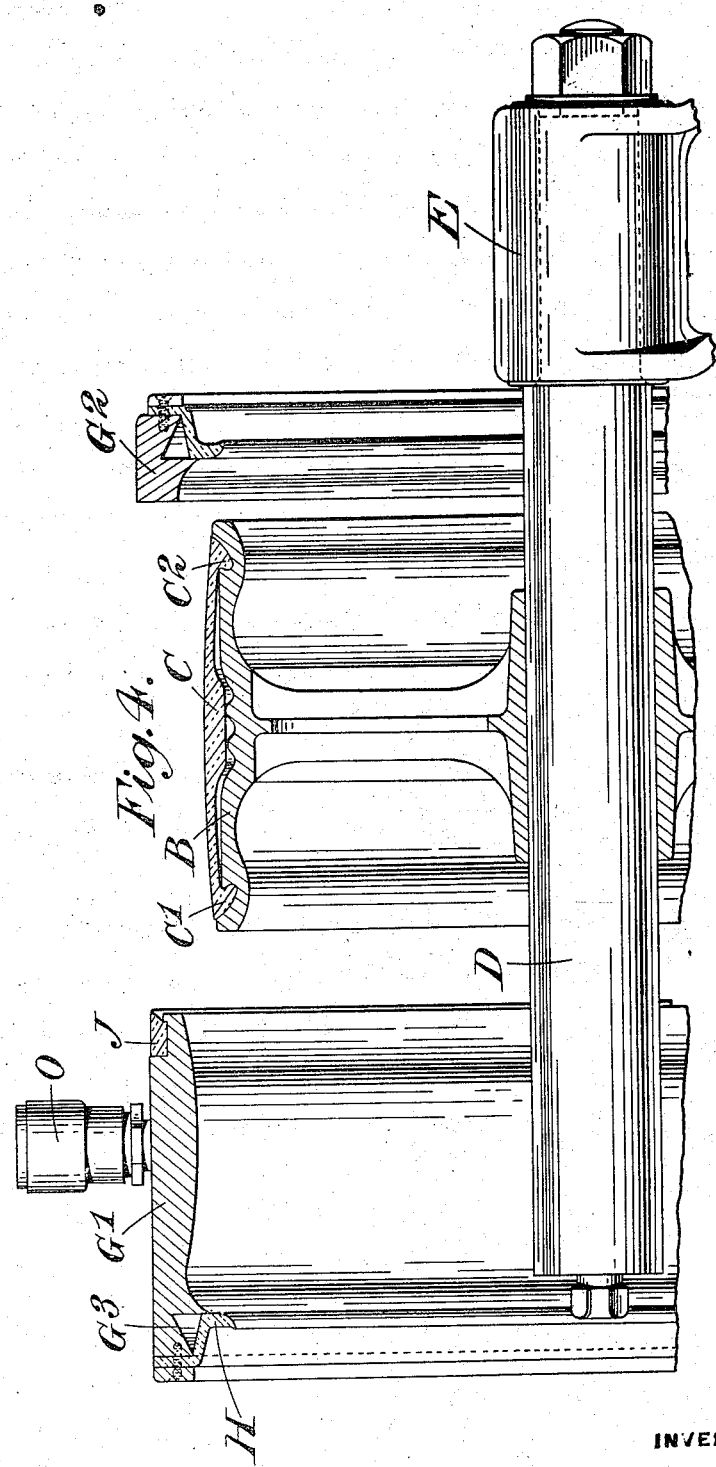

Patented Mar. 18, 1924.

1,487,035

UNITED STATES PATENT OFFICE.

THOMAS SLOPER, OF DEVIZES, ENGLAND.

APPARATUS FOR USE IN THE MANUFACTURE OF RUBBER GOODS.

Application filed January 11, 1923. Serial No. 611,993.

*To all whom it may concern:*

Be it known that I, THOMAS SLOPER, a subject of the King of England, residing at Southgate, Devizes, Wiltshire, England, have invented certain new and useful Improvements in Apparatus for Use in the Manufacture of Rubber Goods, of which the following is a specification.

This invention is for improvements in or relating to apparatus for use in the manufacture of rubber goods and the method of handling such goods during manufacture.

Apparatus is known for manipulating an endless band such as a "flat" tire band to remove it from a cylindrical support whereon it has been vulcanized or partially vulcanized. One form of such apparatus comprises an annular member which is brought into position round the cylindrical support with its tire-band on it and is held in fixed relation thereto. The annular member has inwardly-directed flexible sealing lips which are pressed against the edges of the tire-band so that a closed chamber is thus formed with the tire-band as one wall, and then a greater air pressure is established on that side of the tire-band which lies against the cylindrical support than on the other side, so that the tire-band is expanded away from the cylindrical support, whereupon the support can be removed.

The apparatus referred to may also be used for placing the tire-band on a support or for transferring it from one support to another, and it is found in operating the apparatus in this manner that one edge of the tire-band is liable to stand proud on the support when released thereon from engagement with the annular member, instead of entering the groove provided for it, with the result that the support and band cannot be removed from the annular member. One object of this invention is to modify the apparatus so as to enable the tire-band to be examined and (if required) adjusted after it has been placed on the support and before it is removed from the apparatus.

According to this invention there is provided in apparatus of the kind described above for use in the manufacture of rubber goods and for handling such goods, a "cooperating member" that is divided circumferentially between its sealing lips, and is provided with sealing means for making a fluid-tight joint at the circumferential division. The term "co-operating member" used herein is employed to designate that member to which a "flat" tire-band can be removed from a cylindrical support or from which it is delivered on to a cylindrical support in the manner described above.

According to another feature of this invention a divided co-operating member as described above is characterized by the one divided part being adjustable towards and away from the other for varying the effective width of the member, and guiding means being provided for retaining the said parts in axial alignment one with the other during such adjustment.

According to another feature of the invention the divided co-operating member may be provided with yielding means, for example spring-controlled plungers, carried on one divided part and bearing against the other, which yielding means normally separate the parts at the said joint, and is of a yielding character, in order that the effective width of the co-operating member may be adjusted automatically during the operation of removing the tire-band.

Other features of the invention will be described hereinafter and pointed out in the claims.

One embodiment of the invention and modifications thereof are illustrated by way of example in the accompanying drawing. It is to be understood, however, that the invention is not limited to the precise constructional details enumerated. In the drawings—

Figure 1 is a side elevation showing part broken away and part in vertical section, of one form of apparatus according to the invention comprising a "former," a mould and a circumferentially divided co-operating member surrounding the "former";

Figure 2 is a like view showing the "former" being withdrawn from within the co-operating member after a band has been removed from it.

Figure 3 is a like view showing the mould within the co-operating member and the band carried by the mould, but not correctly positioned thereon; and Figure 4 is a like view showing the two parts of the co-operating member separated, with the mould and its band correctly positioned on the latter situated between them;

Figures 5 and 6 are vertical sectional elevations of parts of modified co-operating members that are divided circumferentially in the centre, provision being made for adjustment of one part in relation to the other.

Like reference characters designate like parts throughout the several views.

Referring first to Figures 1–4, an annular "former" A and an annular mould B for a "flat" tire-band C are mounted to slide axially along a horizontal shaft D having one end securely held in a bracket E bolted to one end of a bed F which extends underneath the shaft. An annular co-operating member, designated generally by the letter G and having sealing lips H movable into and out of lateral annular grooves $G^3$, is mounted on the bed F in the manner described hereinafter in such a position that when either the "former" A or the mould B is situated at the free end of the shaft with their hubs flush with the end face thereof, they are situated centrally within the co-operating member G, so that the tire-band C can be removed from the "former" A to the inner face of the co-operating member and transferred to the mould B in known manner.

According to the present invention the co-operating member G is divided circumferentially between its sealing lips H into two parts $G^1$ and $G^2$, the part $G^2$ being narrower than the part $G^1$, and sealing means in the form of a rubber packing ring J is provided on the part $G^1$ at the joint for co-operating with the part $G^2$ and making the joint fluid-tight.

The part $G^1$ of the co-operating member is carried by a pedestal K bolted on the other end of the bed F under the free end of the shaft D. Mounted in two pairs of lugs $G^4$, $E^1$, provided on the part $G^1$ and the bracket E, one pair at each side of the vertical plane passing through the longitudinal axis of the shaft D, are two horizontal guide-rods L, whereof only one is shown in Figure 1, each of which slidably carries a sleeve M to which the part $G^2$ of the co-operating member is bolted. The guide-rods L are parallel with the shaft D so that the part $G^2$ of the co-operating member can be slid on them in axial alignment away from and towards the part $G^1$, an adjustable stop N being provided, preferably one on each rod L, for co-operating with the sleeves M.

The apparatus shown in Figure 1 may be used as follows:

It will be assumed that the tire-band C has been built up on the "former" A which has been fixed on the shaft D centrally within the co-operating member G, and that the tire-band is to be removed to the mould B prior to its being vulcanized. The tire-band C is first removed from the "former" to the inner face of the co-operating member G in the known manner and as illustrated in Figure 2. The "former" A can then be slid off the shaft D, and the mould B can be slid into a position (Figure 3) centrally within the co-operating member G, ready to receive the band C. When the difference of pressure at the two sides of the band on the co-operating member is removed, the band is released and contracts circumferentially on the mould B: It is found in practice that owing to the effective width of the band having been reduced during its expansion on to the co-operating member, when the band contracts circumferentially and one of its beaded edges, say $C^1$, enters into the lateral groove $B^1$, provided for it in the mould B, the other beaded edge, say $C^2$, may not automatically enter into its groove $B^2$, but stands proud of the periphery of the mould in such a position that it prevents the mould from being slid out of the co-operating member G in either direction without the tire-band fouling the co-operating member. Owing to the co-operating member being divided circumferentially into two parts $G^1$, $G^2$, however, as shown in Figure 4 the part $G^2$ can be slid away laterally from the part $G^1$ a sufficient distance to examine the tire-band, or so far that there is room for the mould B to be situated between the two parts in a position in which the band is readily accessible, so that its beaded edge $C^2$ can be seated by hand in its groove. The mould B with the band C correctly seated on it can then be readily slid off the shaft D through the part $G^1$ of the co-operating member without fouling the latter.

If desired the co-operating member G may be provided with a circle of plungers O of the kind described in the specification of my patent application Serial No. 611,992, filed January 11, 1923. These plungers are guided mechanically so that they can advance radially across the chamber formed between the co-operating member and the tire-band, and each has means, for example a spike, whereby they may engage the tire-band to maintain it in a central position as it expands away from its support.

With tires of large size it is sometimes an advantage to reduce the width of the apparatus during the operation of removing the tire-band, and such adjustment of width may be arranged to take place automatically by separating the two divided parts of the co-operating member by springs and covering the joint with sealing means, such as rubber. Such a construction is illustrated in Figure 5 which shows the co-operating member divided circumferentially into two equal parts $G^5$, $G^6$, each provided with a circle of plungers O. The part $G^5$ is provided in its lateral face at the joint with a number of holes $G^7$ drilled parallel with its throughway axis, in each of which holes is arranged a spring pressed plunger P that bears against the opposed face of the part $G^6$. A rubber sealing ring Q is seated in an annular groove G⁸ formed in the part G⁶ at the joint and makes joint with a flange G⁹ cast on the part G⁵ at the joint. It will be seen that the plungers P tend to separate the two parts G⁵, G⁶ of the co-operating member, but it is found that as the pressure outside the chamber in the co-operating member is made to exceed that within the chamber for the purpose of transferring the tire-band, the two parts of the co-operating member will automatically draw together, so that the width of the co-operating member is automatically adjusted during the operation of removing a tire-band.

Where it is not desired to provide for automatic contraction of the co-operating member, but only to allow a lateral adjustment to suit the varying amount of contraction experienced with different classes of fabric used in constructing the tire-band and the angle at which it is laid, the width of the co-operating member may be made adjustable manually, so that the same apparatus may be used for tires differing in construction. Such a modified form of apparatus is shown in Figure 6, in which again the co-operating member is divided into two equal parts G⁵, G⁶. These parts are adjustably held spaced apart somewhat by manually operable adjusting means which operatively connect them at the central joint. These adjusting means are in the form of capstan studs R arranged in a circle at the joint. Each stud is threaded oppositely at its ends, has a capstan head in the middle and is screwed into both the parts G⁵, G⁶ of the co-operating member. The adjustable joint is made fluid-tight by a rubber ring S seated on ribs G¹⁰ cast on the parts G⁵, G⁶ at the edges of recesses G¹¹ in which a metal strip T for supporting the rubber ring S is seated and bridges the joint.

Obviously the two parts G⁵, G⁶ of the co-operating members shown in Figures 5 and 6 may be mounted in the same manner as the two parts G¹, G² are shown mounted in Figure 1 when it is desired to be able to separate the parts for inspection of the tire-band.

It is to be understood that various modifications may be made in the constructions described above without departing from the scope of the invention as defined in the claims.

What I claim as my invention and desire to secure by Letters Patent is:

1. Apparatus for manipulating expansible "flat" endless bands comprising in combination a support-member for the band having an annular face whereof the general axial direction is parallel to a throughway axis thereof, a co-operating member divided circumferentially and having an annular face whereof the general axial direction is parallel to a throughway axis thereof, which members are of such diameter that one can slide axially within and out of the other, radially disposed flexible sealing-lips, one at each edge of the co-operating member on opposite sides of the dividing plane, arranged to bear against and seal with the edge-portions of the band on the support, which co-operating member is divided circumferentially between said sealing lips into two parts whereof one is movable towards and away from the other guiding means for guiding the movable part of said co-operating member axially in relation to the other; and sealing-means for making a fluid-tight joint between the circumferentially divided parts of the co-operating member substantially as set forth.

2. Apparatus for manipulating expansible "flat" endless bands comprising in combination a support-member for the band having an annular face whereof the general axial direction is parallel to a throughway axis thereof, a co-operating member divided circumferentially and having an annular face whereof the general axial direction is parallel to a throughway axis thereof which members are of such diameter that one can slide axially within and out of the other, radially disposed flexible sealing-lips, one at each edge of the co-operating member on opposite sides of the dividing plane, arranged to bear against and seal with the edge-portions of the band on the support, which co-operating member is divided circumferentially between said sealing lips into two parts whereof one is adjustable towards and away from the other for varying the effective width of said member, guiding means for retaining the said parts in axial alinement during the adjustment of the adjustable part, and sealing-means for making a fluid-tight joint between the circumferentially divided parts of the co-operating member substantially as set forth.

3. Apparatus for manipulating expansible "flat" endless bands comprising in combination a support-member for the band, having an annular face whereof the general axial direction is parallel to a throughway axis thereof, a co-operating member divided circumferentially and having an annular face whereof the general axial direction is parallel to a throughway axis thereof, which members are of such diameter that one can slide axially within and out of the other, radially disposed flexible sealing-lips, one at each edge of the co-operating member on opposite sides of the dividing plane, arranged to bear against and seal with the edge-portions of the band on the support, which co-operating member is divided circumferentially between said sealing lips into two parts whereof one part is automatically adjustable towards and away from the other for varying the effective width of said member, guiding means for retaining said parts in axial alinement during the adjustment of the adjustable part, and sealing-means for making a fluid-tight joint between the circumferentially divided parts of the co-operating member, substantially as set forth.

4. Apparatus for manipulating expansible "flat" endless bands comprising in combination a support-member for the band having an annular face whereof the general axial direction is parallel to a throughway axis thereof, a co-operating member having an annular face whereof the general axial direction is parallel to a throughway axis thereof, which co-operating member is divided circumferentially into two parts, which members are of such diameter that one can slide axially within and out of the other, radially disposed flexible sealing-lips, one at each edge of the co-operating member on opposite sides of the dividing plane, arranged to bear against and seal with the edge-portions of the band on the support, yielding means carried on one of said parts and arranged to bear against the other and normally separating the said parts, and sealing means of a yielding character, for making a fluid-tight joint between the circumferentially divided parts of the co-operating member, substantially as set forth.

5. Apparatus for manipulating expansible "flat" endless bands comprising in combination a support-member for the band having an annular face whereof the general axial direction is parallel to a throughway axis thereof, a co-operating member having an annular face whereof the general axial direction is parallel to a throughway axis thereof, which co-operating member is divided into two parts, spring-controlled plungers carried on one of said parts and arranged to bear against the other and normally separating the said parts, which members are of such diameter that one can slide axially within and out of the other, radially disposed flexible sealing-lips, one at each edge of the co-operating member on opposite sides of the dividing plane, arranged to bear against and seal with the edge-portions of the band on the support, and sealing-means of a yielding character for making a fluid-tight joint between the circumferentially divided parts of the co-operating member, substantially as set forth.

6. Apparatus for manipulating expansible "flat" endless bands comprising in combination a support-member for the band having an annular face whereof the general axial direction is parallel to a throughway axis thereof, a co-operating member having an annular face whereof the general axial direction is parallel to a throughway axis thereof, which co-operating member is divided into two parts, which members are of such diameter that one can slide axially within and out of the other, radially disposed flexible sealing-lips, one at each edge of the co-operating member on opposite sides of the dividing plane, arranged to bear against and seal with the edge-portions of the band on the support, manually operable adjusting means operatively connecting the two parts of the co-operating member at their line of division and adjustably holding the same spaced apart one from the other, and sealing-means for making a fluid-tight joint between the circumferentially divided parts of the co-operating member, substantially as set forth.

7. In apparatus for manipulating expansible "flat" endless bands, the combination of a bed, a horizontal shaft carried thereon, a support for an endless band co-axial with and slidable along said shaft, an annular member of greater diameter than the band which is to be manipulated and having an inner recessed cylindrical face co-axial with said support for receiving the said band, two inwardly-directed sealing lips of flexible material on the edges of the annular member, which project inwardly a sufficient distance to seal with the band on said support, which annular member is divided circumferentially between said sealing-lips into two parts whereof one part is carried on said bed, a guide rod carried on said bed and arranged parallel with said shaft, the other divided part being slidable along said guide rod, and sealing-means for making a fluid-tight joint between said parts at the circumferential division, substantially as set forth.

In testimony whereof I affix my signature.

THOMAS SLOPER.